Dec. 2, 1958

G. R. RADLEY 2,862,838

ELECTRICAL APPARATUS WITH A THERMAL AND
ELECTRIC INSULATION COATING

Filed Aug. 24, 1953

Inventor
Guy R. Radley
By W. E. Lyon
Attorney

United States Patent Office 2,862,838
Patented Dec. 2, 1958

2,862,838

ELECTRICAL APPARATUS WITH A THERMAL AND ELECTRIC INSULATION COATING

Guy R. Radley, Whitefish Bay, Wis., assignor to Cutler-Hammer, Inc., Milwaukee, Wis., a corporation of Delaware Application August 24, 1953, Serial No. 375,896

2 Claims. (Cl. 117—218)

This invention relates to improvements in methods of and means for protecting electrical apparatus from heat and the undesired effects of the action of adjacent electrical arcs.

An electric arc established between spaced metal electrodes is accompanied by vaporized particles of material which are released from the electrodes as an incident to arcing. Certain of these particles, when condensed, are deposited upon those parts of the electrical apparatus which are in close proximity to the electrodes and/or the arc. Since the electrode material thus deposited is electrically conductive, the deposits act to shorten electrical current leakage paths over insulating surfaces in the apparatus and, if sufficiently heavy deposits are formed, may cause short circuits.

Accordingly it is an object of this invention to provide, for the insulating surfaces of electrical apparatus which are subjected to the action of electric arcs, insulating means acting to prevent short circuits and electrical leakage normally effected by disposition of particles of conductive material upon the surface of such apparatus as an incident to electrical arcing.

Another object is to provide an arc-resistant, insulating coating for metal parts of electrical apparatus to protect such parts from electric arcs and to prevent the formation of electrical current leakage paths.

Another object is to provide improved protective coatings for electrical apparatus and methods of producing such coatings.

Another object is to provide a surface coating having improved thermal insulating qualities for electrical apparatus and a novel method of producing the same.

Other objects and advantages of the invention will hereinafter appear.

The accompanying drawings illustrate certain embodiments of the invention, and the steps in producing the same, which will now be described, it being understood that other embodiments are possible without departing from the spirit and scope of my invention as defined in the appended claims.

In the drawings, all of which are drawn to an enlarged scale,

When an electric arc is established between metal electrodes, some of the electrode material is vaporized and is projected outward from the arc. Or, if arc "blowout" means are provided, the vaporized material is projected in the direction in which the arc is "blown." Upon striking a relatively cooler surface, molecules of the metal will solidify and will form a metal deposit on said surface. In practicing my invention a coating of relatively large grains of granular material is applied to such surfaces with an adhesive material in such manner that the individual granules have portions thereof disposed in overlying or overhanging relationship to certain surfaces of said granules with reference to the direction from which the metal vapor or metal particles approach the surface to be protected.

In practicing my invention I prefer to mix with the adhesive material a relatively small-grained filler material to assist in properly positioning the aforementioned relatively large grains of granular material, and to strengthen the coating produced.

Figure 1:
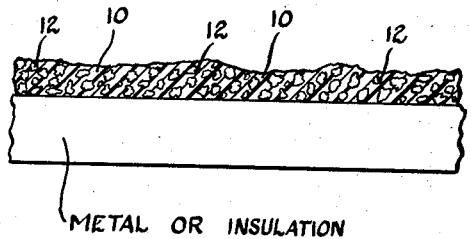
Figure 1 illustrates one stage in the production of my improved protective coating as applied to either a metal or an insulating base, and is also intended to be a fragmentary sectional view of a part of an electrical apparatus provided with a protective coating embodying my invention.

The surface to be coated is covered, as illustrated in Fig. 1, with a layer of a suitable adhesive material 10 in a liquid or substantially liquid state, which adhesive preferably contains a fine grained filler material 12. Relatively much larger grained material is then sprinkled or otherwise applied to the wet surface of the layer of adhesive material. Enough of the larger grains are applied so that the individual large grains are relatively close to one another. These large grains partially embed themselves in the liquid adhesive material. Thereafter the adhesive material is hardened in any suitable or well known manner.

Figure 2:
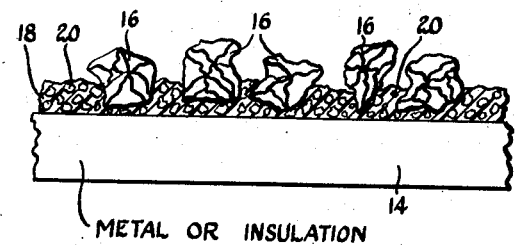
Fig. 2 is a fragmentary sectional view of a part of an electrical apparatus provided with an alternative form of protective coating embodying my invention.

An article 14 of electrical apparatus having such a coating is illustrated in Fig. 2. A substantial portion of most of the individual grains 16 of the large-grained granular material extends above the layer of adhesive material 18 and the granules 20 of filler material. The resulting surface comprises many closely spaced projections in staggered relationship to each other.

Figure 3:
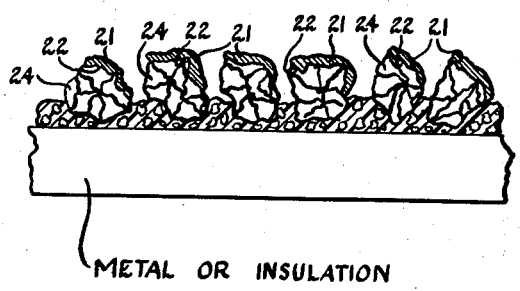
Fig. 3 is a schematic illustration of the protective action of a coating embodying my invention.

Referring to Fig. 3, when such an article is exposed to electric arcs, particles of the electrode material 21 are deposited upon those areas 22 of the surface of the coating which face the direction from which said particles approach. However, none of the electrode material will be deposited on those areas 24 of the surface of the coating which are shielded by areas 22 of the coating. Therefore continuous deposits of electrode material, which might cause short circuits, are prevented from being formed upon the entire surface of the coating. Even though deposits of electrode material are formed on certain surface areas of the coating, the total surface area of the article is increased because of the roughness or unevenness of the coating, so that the lengths of the effective leakage paths over the coated surface of the article are, in general, at least as long as they would be if the surface of the article was smooth.

Instead of providing the particle with a coating of the type hereinbefore described, the surface of said article may be provided with relatively deep serrations, or alternatively, with integrally formed, closely spaced, staggered projections. In respect of preventing the formation of continuous deposits of electrode material, such projections are, under certain circumstances, equivalent to the coatings described. However, of the several materials now available for molding and otherwise forming switch parts and like electrical apparatus, those which are least expensive and which best retain their physical dimensions when heated have realtively poor resistance to deterioration caused by the heat of electric arcs.

Therefore, it is now considered advantageous to coat those surfaces of electrical apparatus which are subjected to the heat of arcs and to the vaporized electrode material with protective coatings of insulating material as herein described.

Because of its ability to satisfactorily withstand high temperatures, its high thermal resistance, and further because of the irregular shape of its crushed particles, quartz has proven an excellent granular material for use both as a filler in the adhesive material and as the larger grained insulating material. The adhesive material should also have good insulation and heat resisting qualities. Silicone resins have been found to be satisfactory adhesive material in these respects and have proven to be superior to organic resins for purposes herein contemplated.

A very satisfactory combination of ingredients is a mixture of silicone resin and a filler of about one mil diameter quartz grains. This material will adhere to the materials commonly used for making electrical apparatus such as phenolic and melamine plastics and metal. I prefer to add suitable volatile thinners or thickeners to the silicone resins so that the mixture has approximately the specific gravity of water and to add to said mixture a volume of filler material equal to between one fourth and two thirds of the volume of said mixture. The resultant mixture may be brushed or sprayed onto the surface to be protected or the latter may be dipped into the mixture, as desired. Large grains of quartz (grains of from 5 to 10 mils diameter are preferable) may be sprinkled over the adhesive layer as soon as the latter has been applied to the article to be coated. These large grains of quartz will settle to some extent (see Figs. 2 and 3) into the liquid silicone resin. The siliconse resin is thereafter air dried and later baked hard. The hardened coating adheres tenaciously to the surface or surfaces to which it has been applied.

Figure 4:
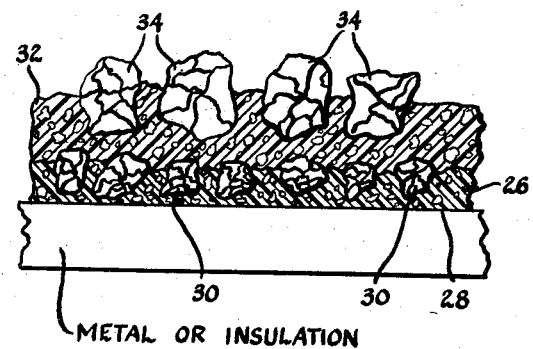
Fig. 4 is a fragmentary sectional view of a part of an electrical apparatus which is provided with another alternative form of protective coating embodying my invention.

Coatings of various thicknesses may be formed by varying the thickness of the adhesive layer in order to obtain the desired "life" under working conditions. The thermal insulating quality and durability of thick coatings is improved if such thick coatings are produced by applying successive layers of thin coatings. In Fig. 4 a double-layer coating is illustrated. The lower layer 26 of adhesive material and filler grains of quartz is first applied to the surface 28 to be protected. Grains 30 of quartz of from 5 to 10 mils diameter are then sprinkled over this first layer. The adhesive layer 26 is then hardened. A second or upper layer 32 of adhesive material and filler grains of quartz is applied over layer 26 and grains 30.

Grains 34 of quartz preferably having diameters in the range from 10 to 20 mils or larger, are sprinkled onto the second layer 32 of adhesive material. The latter is then hardened.

When the article must be protected against heat and protection against the formation of deposits of electrode material is not required, the larger grains of quartz may be omitted. The coating in such cases would consist only of the mixture of adhesive material and filler material. Or the larger grains, if not omitted, may be entirely imbedded in the adhesive material.

When the adhesive material comprises or includes a silicone resin it is hardened by air drying, preferably for about one hour, to form a "skin" on the exposed surface of the resin, and then by baking first at low temperature to evaporate thinner material and other volatile matter and then at progressively higher temperatures to evaporate the remaining volatile matter and to cure and harden the adhesive material. The baking temperature is determined in part by the characteristics of the material to which the coating is applied. Bakelite and most phenolic materials warp and change shape at temperatures above 250 degrees Fahrenheit. Other materials such as melamine plastics can safely withstand temperatures up to 300 degrees Fahrenheit. When applied to such materials, silicone resins may be baked by placing them in a "cold" oven, increasing the temperature over a period of about thirty minutes to between 150 and 200 degrees Fahrenheit, maintaining the latter temperature for about one hour, increasing the temperature during the next thirty minutes to about 350 degrees Fahrenheit (about 250 degrees Fahrenheit when the material coated can safely withstand no higher temperature) and maintaining the temperature at the latter value for about one hour.

Silicone resin will be completely cured or polymerized when subjected to about 500 degrees Fahrenheit for a short time, usually about one hour. If the material coated is metal, the temperature may be increased to this value and the cure completed. However, if the material to be coated is of a type which cannot withstand this temperature, the final curing is accomplished by localized heating of the coating rather than by heating the whole of the coated article. In some instances this local heating of the coating may be effected during normal operation of the device by the heat which it is the purpose of the coating to afford protection against.

When the resin must be finally cured before the apparatus coated with it may be used, the resin is subjected to infra-red radiation while the uncoated portions of the apparatus are cooled by a flow of cooling air under pressure.

Whichever method is used to bake the adhesive material, it is considered preferable to increase the temperature to the final value slowly so that the formation of bubbles in the adhesive material will be minimized.

I claim:

1. An article comprising electrical apparatus having formed thereon a thermal and electric insulation coating for protecting the surfaces of said apparatus against heat and the formation of continuous deposits of electrode material thereon as an incident to electrical arcing, which coating comprises a hardened layer of heat resistant insulating silicone resin material having irregularly shaped relatively large particles of quartz partially embedded therein, said particles being closely spaced in staggered relationship to one another, and substantially all of said particles each having certain portions thereof exposed and in overlying relationship to certain other exposed surfaces thereof with reference to the direction of approach of the particles of electrode material.

2. An article comprising electrical apparatus having formed thereon a thermal and electric insulation coating for protecting the surfaces of said apparatus against heat and the formation of continuous deposits of electrode material thereon as an incident to electrical arcing, which coating comprises a first hardened layer of heat resistant insulating silicone resin having irregularly shaped particles of quartz partially embedded therein and a second hardened layer of heat resistant insulating silicone resin material overlying said first layer and said particles and being bonded thereto, said second layer of material having irregularly shaped substantially larger particles of quartz partially embedded therein, said last mentioned particles being closely spaced in staggered relationship to each other and most of the same having certain portions thereof exposed and in overlying relationship with respect to certain other exposed portions thereof with reference to the direction of approach of the particles of electrode material.

References Cited in the file of this patent

UNITED STATES PATENTS

| | | | |
|---|---|---|---|
| 58,217 | Clark et al. | Sept. 25, 1866 |
| 922,382 | Brenizer | May 18, 1909 |
| 2,258,218 | Rochow | Oct. 7, 1941 |
| 2,290,905 | Butler | July 28, 1942 |
| 2,308,624 | Pouech | Jan. 19, 1943 |
| 2,330,365 | Jackson | Sept. 28, 1943 |
| 2,443,663 | Rider et al. | June 22, 1948 |
| 2,459,018 | DeMonte et al. | Jan. 11, 1949 |
| 2,523,037 | Mathes | Sept. 19, 1950 |
| 2,559,122 | Hessel et al. | July 3, 1951 |
| 2,664,364 | Thom | Dec. 29, 1953 |